United States Patent
Nomura

(10) Patent No.: US 7,318,054 B2
(45) Date of Patent: Jan. 8, 2008

(54) UPDATE SYSTEM AND UPDATE METHOD FOR UPDATING SEARCH DATA

(75) Inventor: Takashi Nomura, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 395 days.

(21) Appl. No.: 11/065,546

(22) Filed: Feb. 25, 2005

(65) Prior Publication Data

US 2005/0192950 A1 Sep. 1, 2005

(30) Foreign Application Priority Data

Feb. 26, 2004 (JP) ............... 2004-051212

(51) Int. Cl.
*G06F 7/00* (2006.01)
(52) U.S. Cl. ............................. 707/1; 707/3
(58) Field of Classification Search ............... 707/1–10
See application file for complete search history.

(56) References Cited

U.S. PATENT DOCUMENTS

2002/0049705 A1* 4/2002 Haviv-Segal et al. .......... 707/1
2004/0024724 A1* 2/2004 Rubin ........................ 706/55
2005/0060647 A1* 3/2005 Doan et al. ................. 715/514

FOREIGN PATENT DOCUMENTS

| JP | 11-295084 | 10/1999 |
|---|---|---|
| JP | 2001-056823 | 2/2001 |

* cited by examiner

*Primary Examiner*—Wilson Lee
(74) *Attorney, Agent, or Firm*—Crowell & Moring LLP

(57) ABSTRACT

A search data update system includes a navigation apparatus in which search data are used and a data provider center that provides the navigation apparatus with update data to be used to update the search data. The update data provided by the data provider center only include new search tree data and update entity data. The new search tree data assume a structure that enables specification of the update entity data and specification of the entity data in the original search data except for the entity data corresponding to the update entity data.

7 Claims, 7 Drawing Sheets

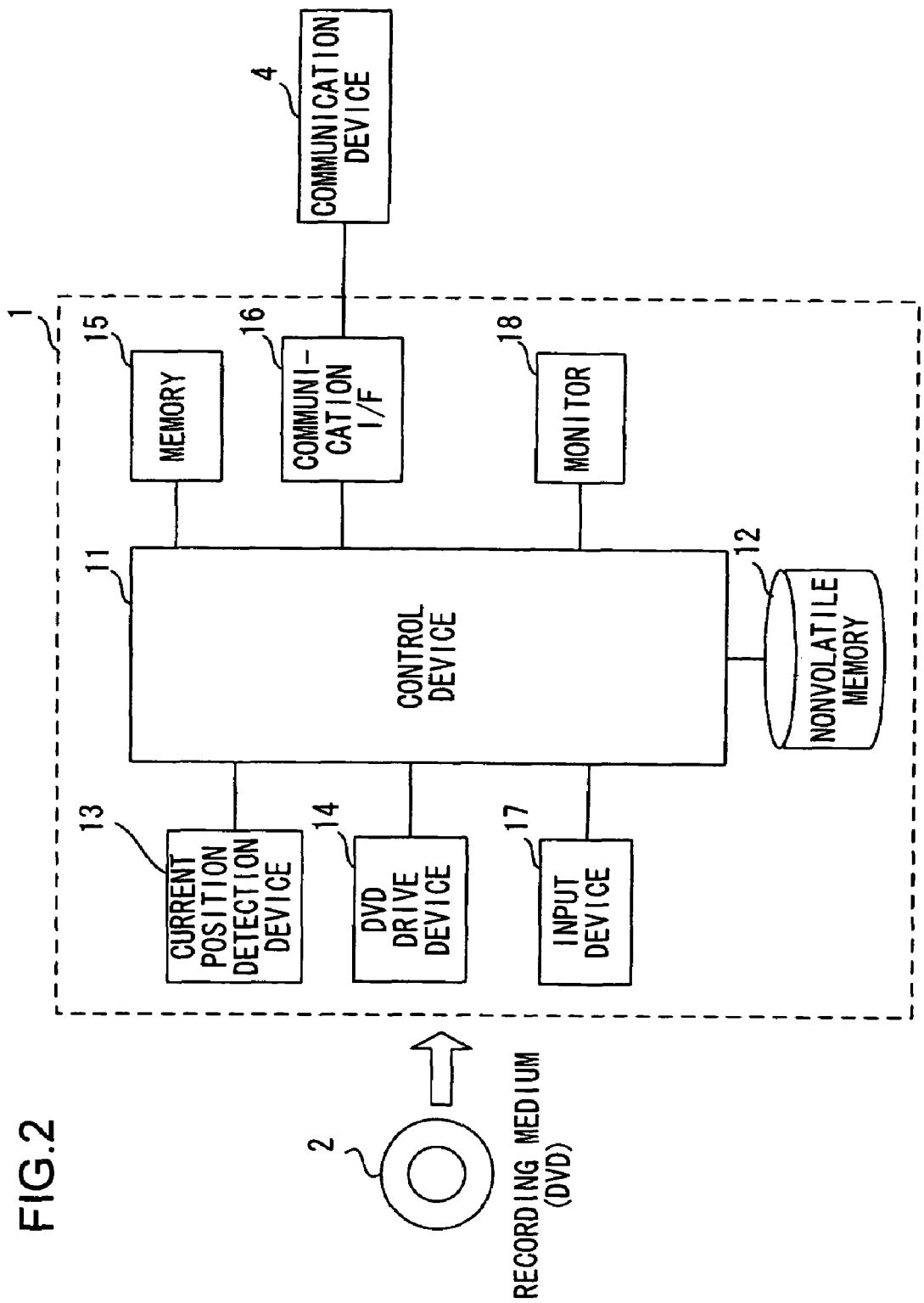

UPDATE SYSTEM AND UPDATE METHOD FOR UPDATING SEARCH DATA

The disclosure of the following priority application is herein incorporated by reference:
Japanese Patent Application No. 2004-051212, filed Feb. 26, 2004

BACKGROUND OF THE INVENTION

1. Field of the Invention

The present invention relates to an update system and an update method adopted to update search data that are used in a navigation apparatus or the like.

2. Description of the Related Art

There is a technology known in the related art adopted in a car navigation apparatus, whereby a map is divided into a plurality of units, map data files are created in correspondence to each of the units and the map data files are updated in units of the individual files (see, for instance, Japanese Laid Open Patent Publication No. 2001-56823). In addition, there is a technology known in the related art adopted to provide map information services through computer communication, whereby only the map data that need to be newly delivered are transmitted without transmitting any map data that are already present in the display memory at a map data display terminal (see, for instance, Japanese Laid Open Patent Publication No. H 11-295084).

SUMMARY OF THE INVENTION

However, these technologies, which relate to map data update, were not developed by taking into consideration the need for updating search data used in navigation apparatuses. Search data provided through communication or the like, as well as map data provided through communication or the like, must be updated with a high degree of efficiency.

The present invention provides an update system and an update method that achieve a highly efficient update of search data used in a navigation apparatus or the like.

According to the 1st aspect of the invention, an update system for updating search data used in a navigation apparatus comprises: a navigation apparatus; and an update data provider apparatus. The navigation apparatus comprises a search data acquisition unit that obtains search data containing first search tree data and a first entity data group constituted with a plurality of sets of entity data that can be specified by using the first search tree data, and a control unit that executes navigation-related processing by using the search data; the update data provider apparatus comprises an update data generation unit that generates at least one set of update entity data and second search tree data assuming a structure that enables specification of the update entity data and enables specification of entity data in the first entity data group other than entity data corresponding to the update entity data, to be used to update the search data, and a provider unit that provides the second search tree data and the update entity data having been generated to the navigation apparatus; the navigation apparatus further comprises an update data acquisition unit that obtains the second search tree data and the update entity data provided by the provider unit of the update data provider apparatus; and the control unit in the navigation apparatus executes navigation-related processing by using the second search tree data and the update entity data obtained by the update data acquisition unit and the entity data in the first entity data group obtained by the search data acquisition unit.

According to the 2nd aspect of the invention, in the update system for updating search data used in a navigation apparatus according to the 1st aspect, it is preferred that: the provider unit of the update data provider apparatus provides the second search tree data and the update entity data by storing the second search tree data and the update entity data in a recording medium; and the update data acquisition unit of the navigation apparatus obtains the second search tree data and the update entity data stored in the recording medium.

According to the 3rd aspect of the invention, in the update system for updating search data used in a navigation apparatus according to the 1st aspect, it is preferred that: the provider unit of the update data provider apparatus provides the second search tree data and the update entity data via a communication medium; and the update data acquisition unit of the navigation apparatus obtains the second search tree data and the update entity data via the communication medium.

According to the 4th aspect of the invention, in the update system for updating search data used in a navigation apparatus according to either one of the 1st through 4th aspects, it is preferred that: the search data are named search data, telephone number search data or mailing address search data.

According to the 5th aspect of the invention, in the update system for updating search data used in a navigation apparatus according to either one of the 1st through 5th aspects, it is preferred that: the search data are managed in units of files each corresponding to a specific unit; and the second search tree data and the update entity data used to update search data in each file are provided in a single file.

According to the 6th aspect of the invention, a navigation apparatus is a navigation apparatus that constitutes an update system for updating search data used in a navigation apparatus according to either one of the 1st trough 5th aspects.

According to the 7th aspect of the invention, an update data provider apparatus is an update data provide apparatus that constitutes an update system for updating search data used in a navigation apparatus according to either one of the 1st through 5th aspects.

According to the 8th aspect of the invention, an update method for updating search data stored in a single file containing search tree data and a plurality of sets of entity data that can be specified by using the search tree data, comprises: generating at least one set of update entity data to be used to update the search data; generating new search tree data assuming a structure that enables specification of the update entity data and specification of the plurality of sets of entity data in the file other than entity data corresponding to the update entity data; and providing the update entity data and the new search tree data in another file different from the single file.

BRIEF DESCRIPTION OF THE DRAWINGS

FIG. 2 is a block diagram of an on-vehicle navigation apparatus;

DESCRIPTION OF THE PREFERRED EMBODIMENT

Figure 1:
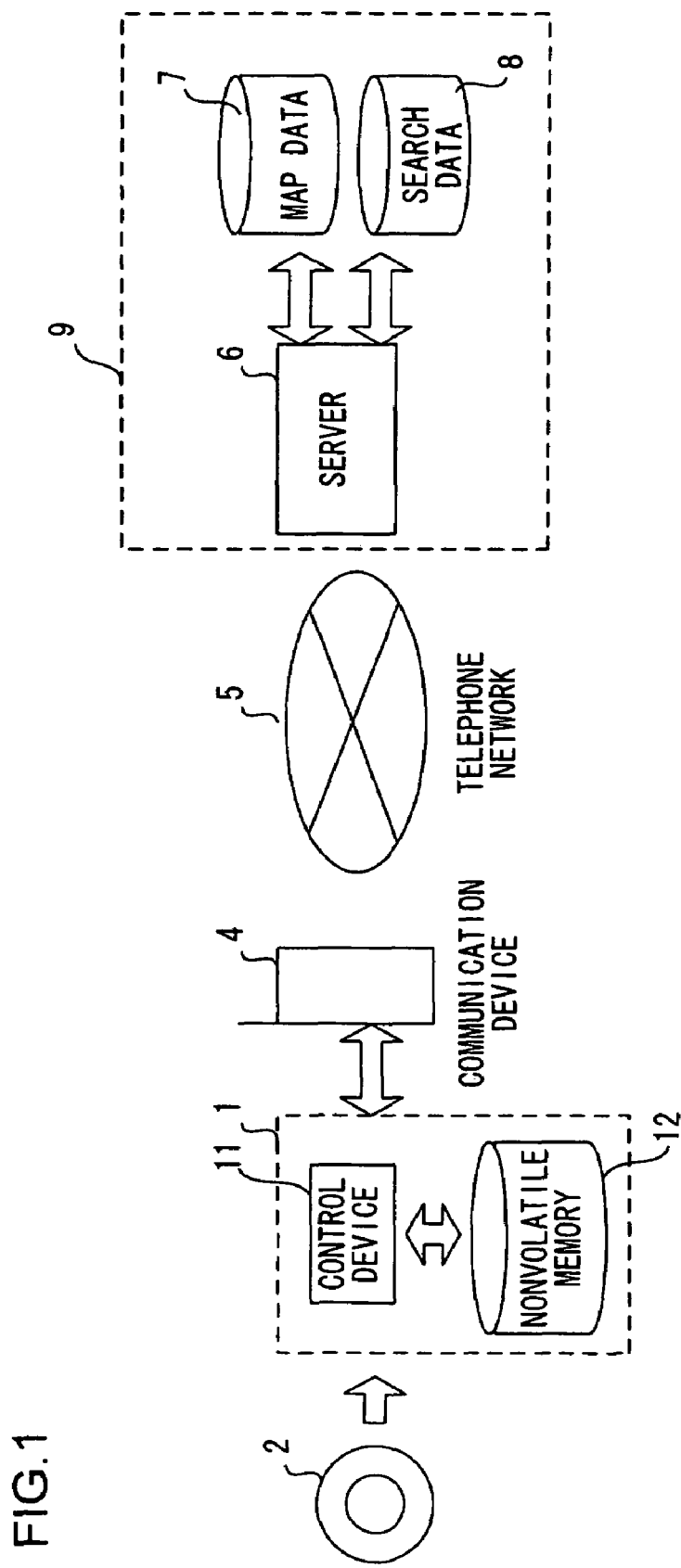
FIG. 1 shows an update system adopted to update search data used in a navigation apparatus.

FIG. 1 shows the update system achieved in the embodiment to update search data used in a navigation apparatus. An on-vehicle navigation apparatus 1 reads map data, search data (guide search data) and the like from a recording medium 2, which may be a CD-ROM or a DVD-ROM. A server 6 at a data provider center 9 reads map data and search data from a map database 7 and a search database 8 respectively and provides update data for the map data and the search data to the navigation apparatus.

The navigation apparatus 1 can connect with a communication device 4 such as a portable telephone. The navigation apparatus 1 can also connect with a telephone network 5 via the communication device 4 and can further connect with the server 6 via the telephone network 5. At the server 6, map data from old versions to the latest version are saved in the map database 7 and search data from old versions to the latest version are saved in the search database 8. Thus, the server 6 is able to provide update data to be used to update part of the map data or the search data at the navigation apparatus 1 via the telephone network 5.

The navigation apparatus 1 includes a control device 11 and a nonvolatile memory 12. The control device 11 is constituted with a microprocessor and its peripheral circuits. The nonvolatile memory 12 may be a hard disk provided as an internal component of the navigation apparatus 1 or it may be a nonvolatile memory such as a flash memory. The nonvolatile memory 12 may assume any form as long as it constitutes a storage device that holds the data written therein intact even when the power to the navigation apparatus 1 is turned off.

The map database 7 and the search database 8 at the data provider center 9, which hold all the versions including the original versions and the most recent versions of map data and search data, may be regarded as databases of mother data. The server 6 is also able to prepare a recording medium 2 holding therein initial (non-updated) map data or search data by using the data at the map database 7 or the search database 8.

FIG. 2 is a block diagram of the on-vehicle navigation apparatus 1. The navigation apparatus 1 comprises the control device 11, the nonvolatile memory 12, a current position detection device 13, a DVD drive device 14, a memory 15, a communication interface 16, an input device 17, a monitor 18 and the like.

The current position detection device 13, which detects the current position of the vehicle, may be constituted with, for instance, an azimuth sensor that detects the advancing azimuth of the vehicle, a vehicle speed sensor that detects the vehicle speed, a GPS sensor that detects a GPS signal transmitted from a GPS (global positioning system) satellite and the like. The DVD drive device 14 reads map data and the like in the recording medium 2 loaded therein. In the embodiment, the recording medium 2 is a DVD-ROM. However, the recording medium 2 may be a CD-ROM or another type of recording medium.

The memory 15 is used to store the vehicle position information detected with the current position detection device 13 and the like and also to store node information, link information and the like of the nodes and the links on a recommended route calculated by the control device 11. The memory 15 constitutes a working area for the control device. The communication interface 16 is used to achieve a connection with the communication device 4. The use of a portable telephone and an Internet connection are enabled via the communication interface 16.

At the monitor 18 a map, a recommended route and various types of information are displayed. The monitor 18 may be provided as an integrated part of the navigation system main unit or it may be provided as a separate encased unit. In addition, the monitor 18 disposed at an isolated position may be connected to the navigation system main unit through a cable or the like. Through the input device 17, the destination for the vehicle and the like are entered when conducting a route search. It is also used when entering search keys. It may be constituted as a remote-control unit or it may be constituted as a touch panel disposed on the screen at the monitor 18.

The control device 11 executes various types of navigation processing such as road map display, route calculation (route search) and route guidance by using the current vehicle position information detected with the current position detection device 13, the map data and the search data stored in the recording medium 2 or the nonvolatile memory 12. It is to be noted that a program of the various types of processing executed by the control device 11 is installed in a ROM (not shown) provided inside the control device 11.

The server 6 at the data provider center 9 is a computer system that executes various types of processing including delivery of update data by using the map database 7 and the search database 8. The computer system constituting the server 6 may be any of various types of computers including general-purpose computers, workstations and personal computers.

Next, an explanation is given on the map data and the search data used in the navigation apparatus 1.

—Map Data—

The map data are information related to maps and include background (for map display) data, road (locator) data, route search data (network data) and route guidance data (information indicating intersection point names, road names, directional terms, directional guidance facility information and the like). The background data are used to display a background of a road or a background in a road map. The road data are used to specify the current vehicle position on the road, for map matching and the like. The route search data, which are constituted with branching information and the like not directly relevant to the specific road shapes, are mainly used when calculating a recommended route (when executing a route search). The route guidance data include the names of intersection point and the like, and are used to provide guidance for the driver or the like along the calculated recommended route.

The road data (locator data) are link string data with which roads are each expressed as a link string containing links and nodes. A node may be an intersection point or a specific point that is specially set on the road. A link corresponds to the portion of the road between two nodes and a given road is expressed as a string of a plurality of links (a link string). Details of link string data are known in the related art. The background data are, for instance, polygon data and polyline data. A road is displayed by using polyline data.

—Search Data—

The search data are not used to specify a desired point on the map, but are used to determine a desired point through a search. For instance, when executing a route search, the user can enter the name, the telephone number, the address or the like of a specific facility and the position of the facility determined by using the search data can be set as the destination. The control device 11 sets the geographic point determined by using the search data as the destination and executes processing such as a route search.

The search data includes various types of data, such as name (phonetic) search data, telephone number search data and address search data. The name search data, which are used to specify the positions of facilities on the map by name, are provided as data files each created in correspondence to a given category for each prefecture. There are various categories such as "rail station", "airport", "ferry", "department store", "hotel" and "gas station". Each file contains search tree data that allow a name-based search and entity data.

The telephone number search data, which are used to specify the positions of facilities on a map by their telephone numbers, are provided as data files each corresponding to a specific combination of the first two digits of the area code. Each file contains search tree data that allow a telephone number-based search and entity data. The mailing address search data, which are used to specify the positions of facilities on the map by their mailing addresses, are provided as data files, each corresponding to a specific municipality in a given prefecture. Each file contains search tree data that allow a mailing address-based search and entity data. The entity data in the various types of search data contain name information, telephone number information, mailing address information, positional information and the like corresponding to the individual facilities. It is to be noted that the positional information in the search data is positional coordinate data that indicate the positional coordinates of the facilities by their latitudes and longitudes or the like. The entity data may be referred to as facility data, site data or search-object data.

—Update of Search Data—

Figure 3A:
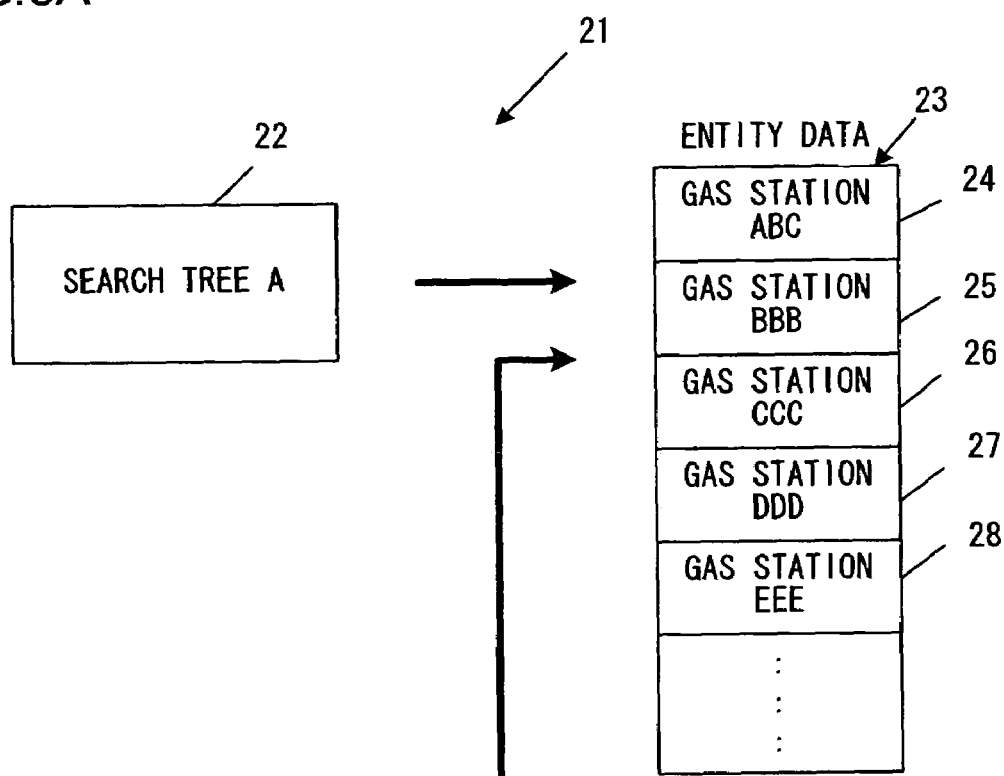
FIGS. 3A and 3B illustrate a method adopted to update a single search data file.

FIG. 3 illustrates the method adopted in the embodiment to update a given search data file. FIG. 3A shows a pre-update name search data file 21, which may be the name search data file for the category "gas station" in "Kanagawa Prefecture". The name search data file 21 is a single data file with which data read/write and the like are managed.

The name search data file 21 is constituted with search tree data A 22 and a entity data group 23 that includes a plurality of sets of entity data. The search tree data A22 are data adopting a hierarchically layered structure (tree structure), which are provided to enable a search for desired entity data by the name. The search tree data A 22 are used to specify (search for) a set of or a plurality of sets of entity data corresponding to the specified name(s). The entity data group 23 includes a plurality of sets of entity data. In the example presented in FIG. 3A, the entity data group 23 includes a plurality of sets of entity data such as entity data 24 for a gas station ABC, entity data 25 for a gas station BBB, entity data 26 for a gas station CCC, entity data 27 for a gas station DDD and entity data 28 for a gas station EEE. Each set of entity data contain information indicating the name, the telephone number, the mailing address, the position and the like of the corresponding facility (business establishment or the like).

The following explanation focuses on an update of the name search data file 21 for the category "gas station" in Kanagawa Prefecture. Let us now assume that the name search data file is to be updated by deleting the entity data 26 for the gas station CCC and adding new entity data for gas stations ACC and GG.

Figure 3B:
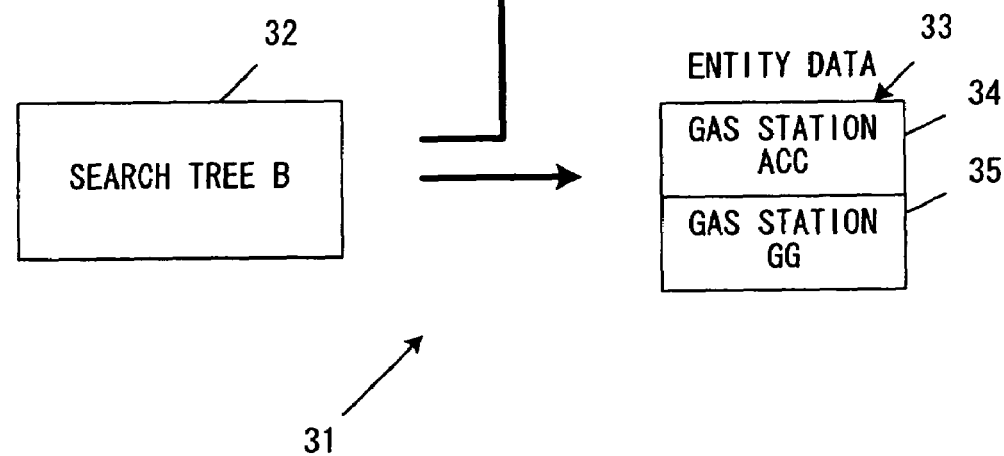

FIG. 3B shows an update data file 31 created to execute this update. The update data file 31 includes search tree data B 32 and update entity data 33. The update entity data 33 only include entity data 34 for the gas station ACC and entity data 35 for gas station GG, which are to be added. The search tree data B 32 are structured so as to enable specification of entity data in the entity data group 23 in the name search data file 21 and entity data in the update entity data 33. The name search data file 21 in FIG. 3A is left intact.

Namely, the name search data file 21 is not updated by generating a new name search data file having a new entity data group that no longer includes the entity data 26 for the gas station CCC but includes the additional entity data 34 and entity data 35 for the gas stations ACC and GG and new search tree data with which entity data in the new entity data group can be specified. Instead, the name search data file 21 is left intact and the update data file 31 that only contains another set of search tree data B 32 and the additional entity data 34 and 35 to be used for the update is simply added in the embodiment. It is to be noted that since the new search tree data B 32 assume a structure which does not allow specification of the entity data 26 for the gas station CCC, no problem arises even if the entity data 26 for the gas station CCC remain in the name search data file 21.

As a result, the volume of data that must be provided for the search data update is reduced. This, in turn, makes it possible to reduce the communication cost necessitated by the data update, the length of communication time and the length of time required to execute the update processing.

For instance, let us assume that the name search data file 21 contains the search tree data 22 amounting to 10 MB (megabytes) and the entity data group 23 amounting to 10 MB, and thus, the size of the entire name search data file 21 is 20 MB. It is also assumed that the volume of each set of entity data is approximately 1 KB (kilobyte) and that the volume of the search tree data used to specify entity data increases to 11 MB after the update.

If the entire name search data file 21 was regenerated, the size of the new name search data file 21 would be 21.1 MB, the makeup of which would include 11 MB (the new search tree data), 10 MB (the pre-update entity data group 23) and 2 KB (the additional entity data for the gas stations ACC and GG)—1 KB (the deleted entity data for the gas station CCC). The size of the update data file 31 generated by adopting the update method in the embodiment, on the other hand, is only 11.2 MB, the makeup of which includes 11 MB (the new search tree data) and 2 KB (the additional entity data for the gas stations ACC and GG). Namely, while it would be necessary to provide 21.1 MB of data to update the name search data file 21 if the entire name search data file 21 was to be re-created from scratch, only 11.2 MB of data need to be provided in the update method achieved in the embodiment.

Figure 4:
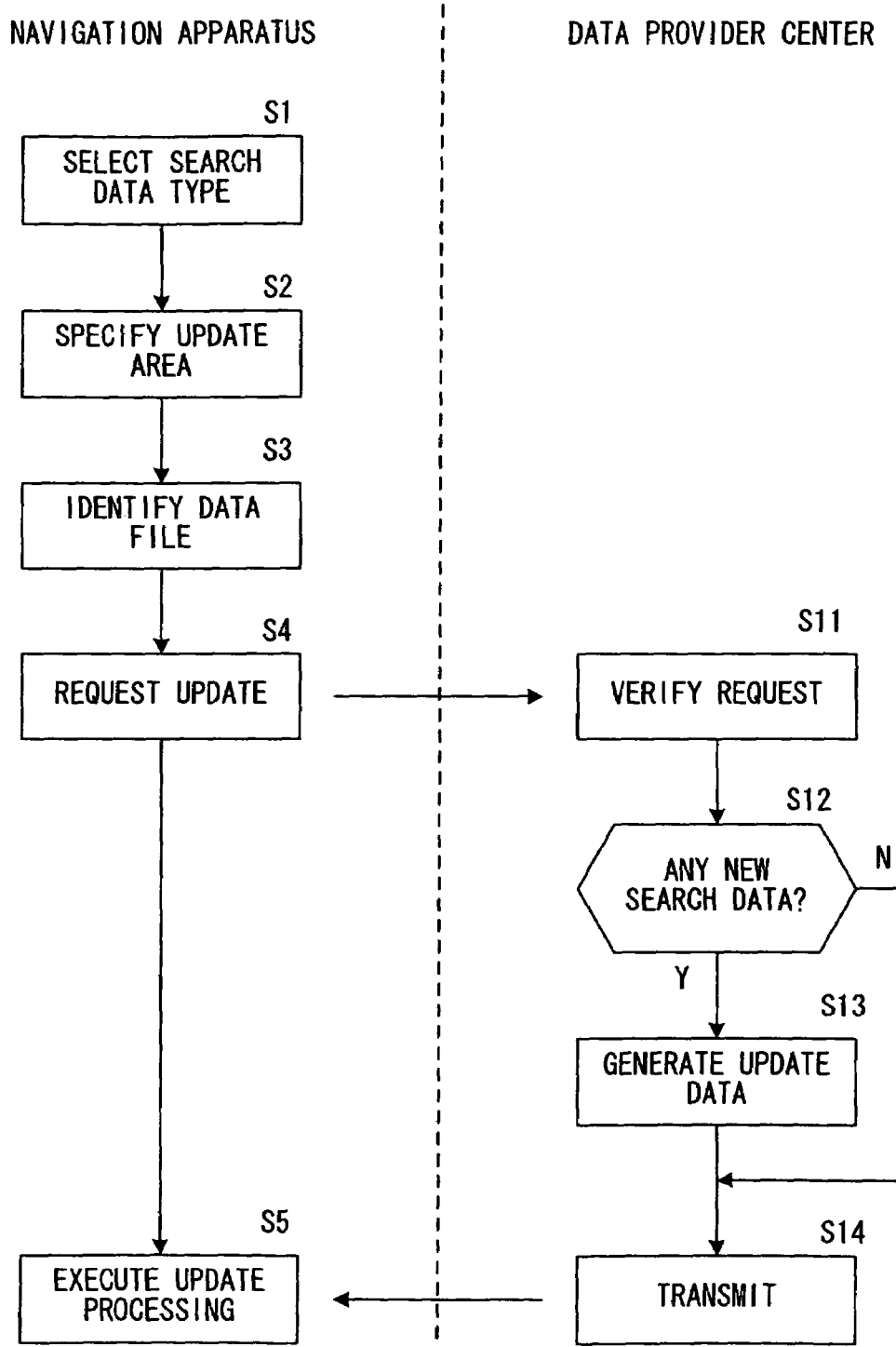
FIG. 4 illustrates how information related to a search data update is exchanged between the navigation apparatus and the data provider center.

FIG. 4 shows how information needed to update search data is exchanged between the navigation apparatus 1 and the data provider center 9. The processing at the navigation apparatus 1 is executed by the control device 11 in conformance to a specific program. The processing at the data provider center 9 is executed by the server 6 in conformance to a specific program. The processing at the navigation apparatus 1 in FIG. 4 starts as a menu item "search data update" is selected in a menu screen or the like at the navigation apparatus 1.

In step S1, the control device 11 in the navigation apparatus 1 selects the type of search data to undergo the update. For the search data type selection, a data classification (type) selection screen is brought up on display at the monitor 18.

Then, the operation waits for the user to select the type of data to be updated through the input device 17. The data classification selection screen may include options such as "name search data", "telephone number search data" and "mailing address search data" so as to allow the user to select one of the options. Then, in response to the selection made by the user, the data type is specified (selected).

In step S2, the control device 11 in the navigation apparatus 1 prompts the user to verify the update area. More specifically, it may provide a message "specify area for search data update" as an audio output or as a visual prompt displayed on the monitor 18. At the monitor 18, a map screen with a cursor is brought up on display. The user uses the input device 17 to scroll the map screen up/down and left/right so as to set the cursor on the desired area (geographic point). Once the cursor is set at the desired area (geographic point), a confirm button is operated to specify the update area (geographic point, position).

In step S3, the control device 11 in the navigation apparatus 1 identifies the correct search data file corresponding to the specified update area (geographic point). If there is an update data file, the update data file, too, is identified. The update data file is assigned with a file name that achieves a specific correlation with the file name of the search data file.

From the search data file and the update data file thus identified, version information (editions, update dates, data generation dates and the like) is obtained. If there is an update data file, the version of the update data file is regarded as the most recent version of the search data file. If there is a plurality of update data files, the version of the most recent update data file is regarded as the latest version of the search data file.

In step S4, the control device 11 in the navigation apparatus 1 issues an update request to the data provider center 9. More specifically, it implements control on the portable telephone constituting the communication device 4 via the communication interface 16 so as to originate a phone call to the data provider center 9 from the portable telephone. Once the call is connected, the update request is transmitted. The update request is issued by transmitting information indicating the type of search data to be updated, the file name of the search data file and the version of the search data file and also the version information indicating the update data file version if there is any update data file. The communication between the navigation apparatus 1 and the data provider center 9 is achieved by using a digital data communication function of the portable telephone.

In step S11, the server 6 at the data provider center 9 verifies the request transmitted from the navigation apparatus 1. Namely, it obtains the information indicating the search data type, the file name of the search data file and the like and the version information having been transmitted, and then the operation proceeds to step S12.

In step S12, the server 6 at the data provider center 9 accesses the search database 8 and makes a decision as to whether or not there is a new version of the search data corresponding to the search data file based upon the information indicating the search data type and the search data file name and the like and the version information having been obtained. The presence of a new version of the search data indicates that entity data have been added, modified or deleted and that there are search tree data newly generated to enable specification of entity data following such addition, modification or deletion.

If it is decided in step S12 that there is a new version of the search data, the operation proceeds to step S13, whereas the operation proceeds to step S14 if it is decided that there is no new version of the search data. In step S13, the server 6 at the data provider center 9 generates update data. The update data are constituted of the update data file 31 explained earlier.

In step S14, the server 6 at the data provider 9 transmits the update data (the update data file) generated in step S13 to the navigation apparatus 1. It is to be noted that if it is decided in step S12 that there is no version of the search data, data indicating the absence of a new version of the search data are transmitted.

In step S5, the control device 11 in the navigation apparatus 1 executes update processing on the search data. In more specific terms, it stores the update data file transmitted thereto into the nonvolatile memory 12. If data indicating that there is no new version of the search data have been transmitted, a message indicating the absence of a new search data version is displayed at the monitor 18.

—Search Processing—

Figure 5:
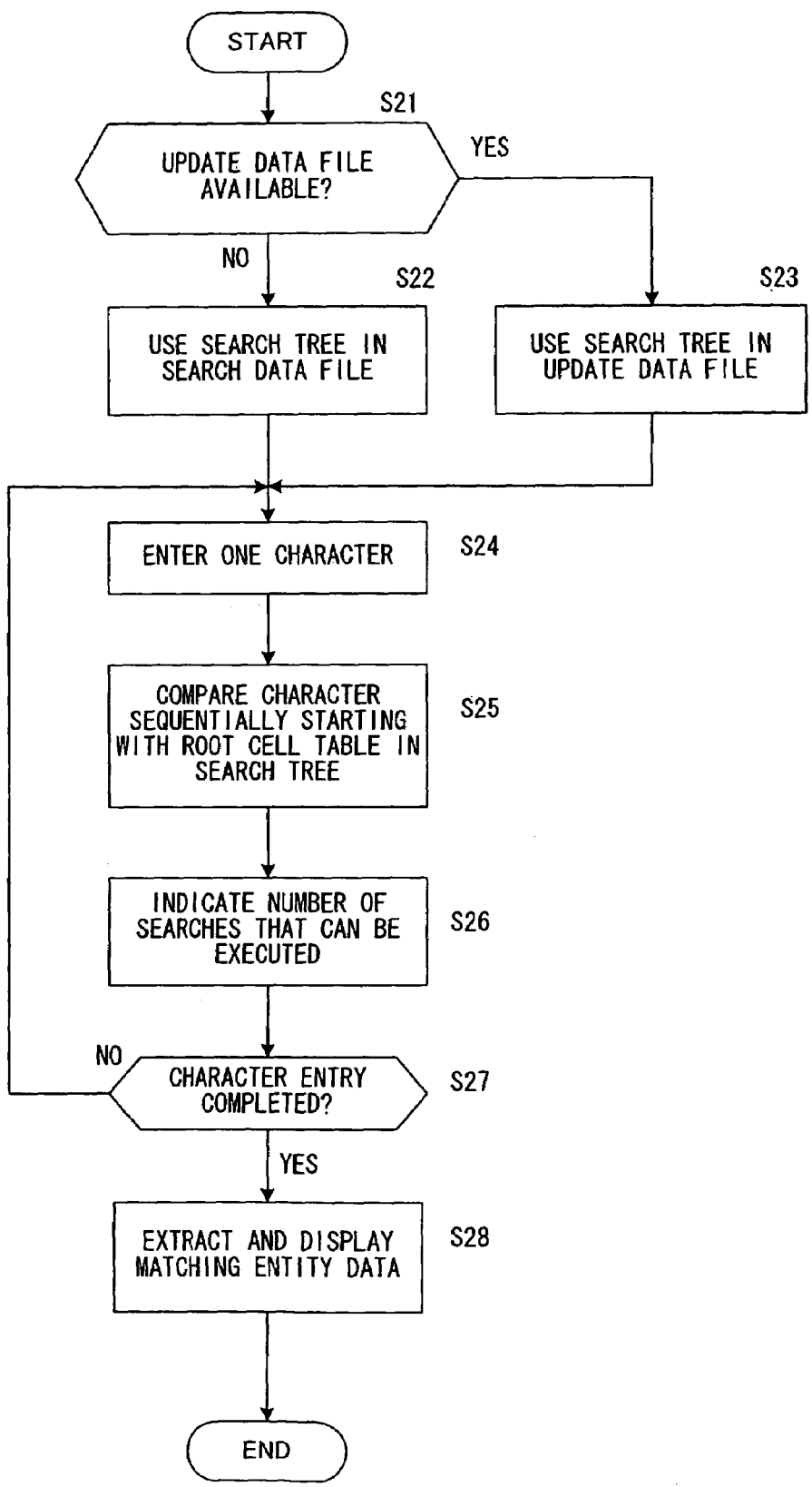
FIG. 5 presents a flowchart of the search processing executed in the navigation apparatus.

FIG. 5 presents a flowchart of the search processing executed at the navigation apparatus 1. The search processing is executed by using the name search data in FIG. 5. As the user enters specific characters one at a time through the input device 17, the facility name matching the entered characters is searched. It is to be noted that the explanation is given in reference to FIG. 5 by assuming that the category and the area corresponding to the search subject have already been specified. Namely, it is assumed that a specific search data file has already been identified.

In step S21, the control device 11 makes a decision as to whether or not there is any update data file related to the subject search data file. Namely, it makes a decision as to whether or not update processing has been executed previously for the subject search data file. If an update data file related to the subject search data file is stored, it is judged that update processing has been executed previously.

If it is decided in step S21 that there is no update data file, the operation proceeds to step S22, whereas the operation proceeds to step S23 if it is decided that there is an update data file. In step S22, the search tree data in the name search data file, i.e., the original search tree data are obtained and then the operation proceeds to step S24. In step S23, the search tree data in the update data file are obtained before the operation proceeds to step S24. If there is a plurality of update data files, the search tree data in the update data file in the most recent version are obtained.

The search tree data in the name search data file are read from the name search data file stored in the recording medium 2. The search tree data in the update data file are read from the nonvolatile memory 12. The search tree data having been read are stored into the memory 15, and subsequently, comparison processing and the like are executed by using the data in the memory 15. It is to be noted that the data file in the recording medium 2 may be first read out into the nonvolatile memory 12 and, in such a case, the data file can be obtained by accessing the nonvolatile memory 12 as is the update data file.

In step S24, the control device 11 obtains the character having been entered by the user through the input device 17. In step S25, the comparison processing is executed on the first character having been entered by using the search data. Namely, the search tree data having been obtained are used to execute the comparison processing for the character.

Figure 6:
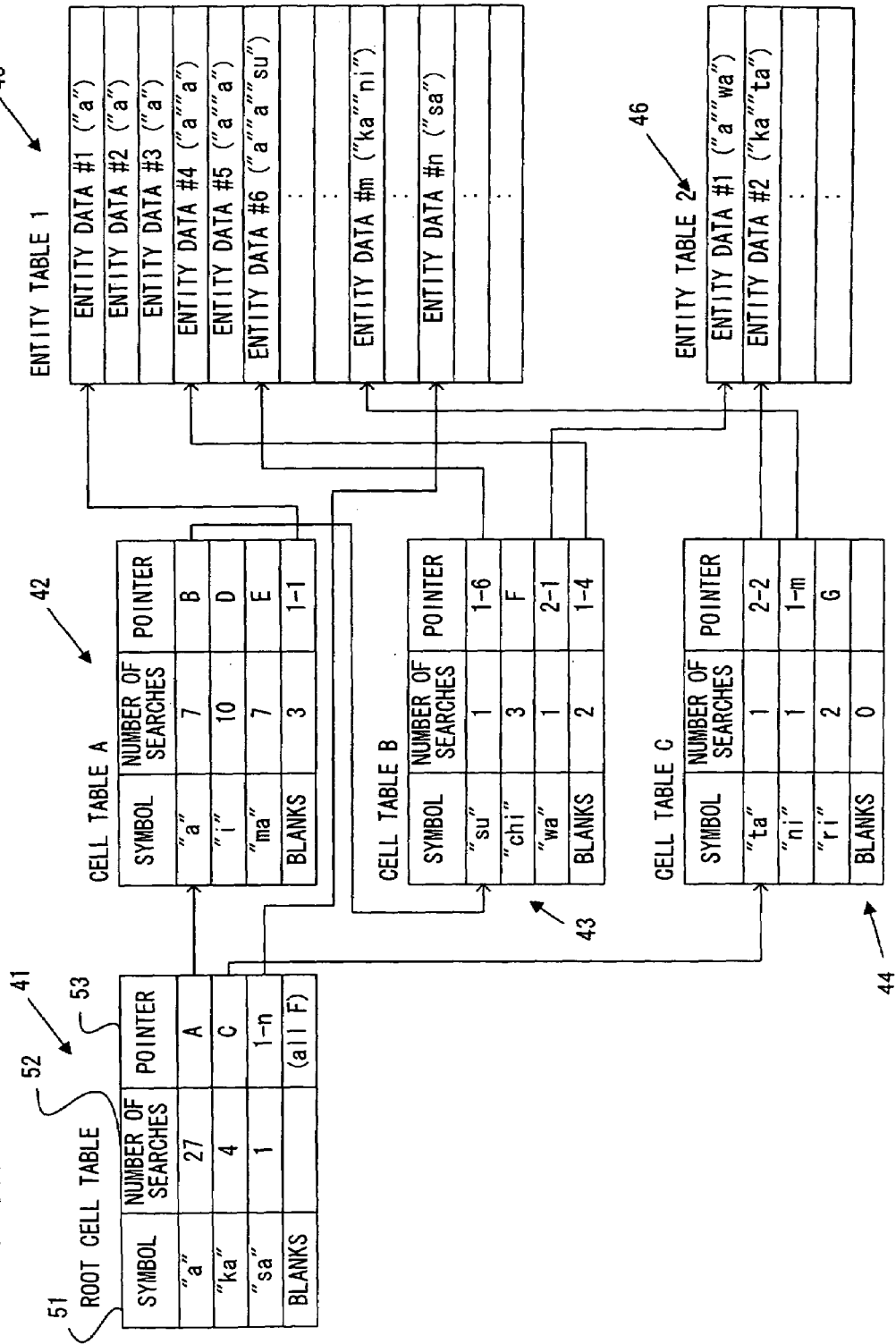
FIG. 6 illustrates the comparison processing executed by using the search tree for the name search data.

FIG. 6 illustrates the comparison processing executed by using the search tree data in the name search data. The search tree is constituted with a single root cell table 41 and a plurality of cell tables 42 through 44. While alphabetic characters are used, e.g., the gas station ABC, in the names of the gas stations in the example presented in FIG. 3, the Japanese alphabet system hiragana is used in the explanation given in reference to FIG. 6. However, the same basic principle applies, whether the names are written by using alphabetic characters or hiragana characters. The same principle also applies to names written by using numerical characters or katakana characters. And also alphabetic characters of any language of any country may be used. In case of English alphabet, Japanese hiragana characters "a", "i", "u", "e", "o" and so on can be replaced with English alphabet characters "a", "b", "c", "d", "e" and so on in the following explanation.

The root cell table 41 is a table of the first characters (leading characters) in the facility names. "Symbol" assigned with reference numeral 51 in the root cell table indicates first characters of facility names, and in the example presented in FIG. 6, three different characters, "a", "ka" and "sa", are listed as the first characters. A number of searches 52 indicates the number of sets of entity data available in correspondence to each character. As "pointer" 53, a pointer to a lower-order cell table or a pointer to entity data is entered. In the example presented in FIG. 6, pointers to lower-order cell tables indicate characters A, B, C, ... , assigned to the individual cell tables, whereas pointers to entity data each indicate the number assigned to a specific entity table and the number assigned to the specific entity data in the entity table.

It is to be noted that new search tree data are generated while the pre-update entity data group is left intact and new update entity data are added, as described earlier to update search data in the embodiment. The cell tables 41 through 44 in the search tree in FIG. 6 correspond to the search tree data B 32 in FIG. 3B, the entity table 1 (45) in FIG. 6 corresponds to the entity data group 23 in FIG. 3A, and the entity table 2 (46) in FIG. 6 corresponds to the update entity data 33 in FIG. 3B.

The cell table A 42 in FIG. 6 is a table specified by the pointer corresponding to the symbol "a" in the root cell table 41. In this example, "a", "i" and "ma" are listed as characters that come after the first character "a", and the corresponding numbers of sets of entity data are 7, 10 and 7 respectively. "BLANKS" indicates that there is no further character following the first character "a", and the corresponding number of searches indicates that there are three sets of entity data for the name constituted with the character "a" alone. The pointer for "BLANKS" points to the leading portion of the corresponding set of entity data in the entity table.

The cell table B 43 is a table specified by the pointer corresponding to the character "a" in the cell table 42. In this example, "su", "chi" and "wa" are listed as characters that come after the first two characters "a""a", and the corresponding numbers of sets of entity data are 1, 3 and 1 respectively. "BLANKS" indicates that there is no further character following the first character "a""a", and the search number indicates that there are two sets of entity data corresponding to the name constituted with the character "a" alone. The pointer for "BLANKS" points to the leading portion of the corresponding set of entity data in the entity table. The cell table C 44 assumes a similar structure.

In step S25, the relevant cell tables are identified each in correspondence to one of the characters having been entered and the search is thus carried out by using the cell tables in the search tree described above. In step S26, the number of sets of search data that can be searched, as determined through the processing in step S25 is indicated at the monitor 18. Namely, the number of facilities having names written with leading characters matching the characters having been input thus far is indicated.

In step S27, a decision is made as to whether or not the character entry has been completed. More specifically, a decision is made as to whether or not a search button disposed at the input device 17 or the like has been pressed. If it is decided that the character entry has not been completed, the operation returns to step S24 to continuously execute the processing. If, on the other hand, it is decided that the character entry has been completed, the operation proceeds to step S28.

In step S28, the matching entity data are extracted and their contents are displayed. Namely, a list of the entity data extracted based upon the results of the comparison of the entered characters with the search tree executed in step S25 is displayed at the monitor 18. The cell table pointer needs to contain data that enable a data access by distinguishing the entity data group in the original search data file from the update entity data when extracting the matching entity data. For instance, an identifier to be used to identify the entity data in the search data file as distinct from the entity data in the update data file may be attached. This identifier may be constituted of the first numeral indicated in the pointer data, such as "1" in 1-n or "2" in 2-1. Alternatively, the identifier may directly indicate the search data file name or the update data file.

The user selects one candidate from the search results brought up on display. In more specific terms, the user moves the cursor on the monitor 18 by using the input device 17, sets the cursor at the desired search candidate and presses the confirm button. As a result, one of the candidates indicated as the search results is selected. Thus, a destination, for instance, can be set by using the search data.

The following advantages are achieved by adopting the update system for updating search data explained above.

(1) When search data are updated, only new search tree data and update entity data are generated. In other words, the original entity data are retained and used as long as no change has been made in the entity data. As a result, the volume of data that need to be provided to update search data can be reduced. This, in turn, makes it possible to reduce the communication cost necessitated by the update, the length of communication time and the length of time required to execute the update processing. It is to be noted that the new search tree data assume a structure that allows specification of update entity data and specification of the original entity data unaffected by the update.

(2) Since data are updated in units of individual files, the update can be executed with ease and the update management, too, is facilitated. In addition, since a file that needs to be updated alone can be specified, it is possible to obtain the absolute minimum volume of update data to simplify the process of update data acquisition and save time and money when obtaining the update data.

(3) Since the original search data files are retained intact in the navigation apparatus 1, old search data can be referenced easily whenever necessary.

(4) The data provider center 9 ascertains the most recent version of data held in the navigation apparatus 1 and transmits data only if there is a newer version of data than the version held at the navigation apparatus 1. As a result, a transmission of redundant update data is not executed.

While an explanation is given above in reference to the embodiment on an example in which name search data are updated, the present invention may be adopted equally effectively when updating other types of search data.

While an explanation is given above in reference to the embodiment on an example in which the navigation apparatus 1 and the data provider center 9 are connected through the telephone network 5, the present invention is not limited to this example and the navigation apparatus and the data provider center may be connected through another communication line (communication medium). For instance, they may be connected with each other via the Internet or they may be connected by using a dedicated line.

While an explanation is given above in reference to the embodiment on an example in which update data (update data files) are provided via the communication line (communication medium) in the telephone network 5, the present invention is not limited to this example. Update data (update data files) may instead be provided in a recording medium such as a CD-ROM or a memory card.

While an explanation is given above in reference to the embodiment on an example in which search data are managed in units of files and are updated in units of individual files, the present invention is not limited to this example. For instance, search data may be updated and managed by further dividing each file into even smaller data portion units. Namely, the search data may be managed and updated in any units as long as the search data update can be managed effectively in such units.

While an explanation is given above in reference to the embodiment on an example in which the search data include name search data, telephone number search data and mailing address search data, the present invention is not limited to this example, and the search data may include another type of search data. Namely, the present invention may be adopted in conjunction with any type of search data that can be used to identify specific positions.

In the embodiment explained above, the name search data are provided in the form of data files each corresponding to a specific category for a given prefecture, the telephone number search data are provided in the form of data files each corresponding to a specific combination of the first two digits of the area code and the mailing address search data are provided in the form of data files each corresponding to one of the municipalities in a given prefecture. However, the present invention is not limited to these examples, and data files may be generated in correspondence to other units.

While an explanation is given above in reference to the embodiment on an example in which the DVD drive device 14 is installed at the navigation apparatus 1, the present invention is not limited to this example. The navigation apparatus 1 may include the nonvolatile memory 12 such as a hard disk alone, and all the map data and the search data may be acquired through communication. Alternatively, and IC card slot or the like may be provided at the navigation apparatus 1 so as to allow update data used to update search data to be provided in a removable memory such as an IC card.

While an explanation is given above in reference to the embodiment on an example in which the navigation apparatus is the type that is installed in a vehicle, the present invention is not limited to this example. For instance, the present invention may be adopted in conjunction with a portable navigation apparatus, instead.

While an explanation is given above in reference to the embodiment on an example in which the programs executed by the navigation apparatus 1 and the server 6 are already installed in the respective apparatuses, the present invention is not limited to this example. These programs may be provided in recording media such as DVDs or CD-ROMs. In such a case, each apparatus must include a data read device capable of reading the data from the recording medium. Alternatively, the programs may be provided via a transmission medium such as a communication line, a typical example of which is the Internet. In other words, the programs may be converted to and transmitted as signals on a carrier wave on which the transmission medium is carried.

While an explanation is given above in reference to the embodiment on an example in which the present invention is adopted in conjunction with a dedicated navigation apparatus installed in a vehicle, the present invention is not limited to this example. The control program for the navigation apparatus 1 described above may be executed on a personal computer to realize the navigation apparatus in the personal computer. In such a case, the current position detection device 13 and the like should be connected to a specific I/O port of the personal computer.

Figure 7:
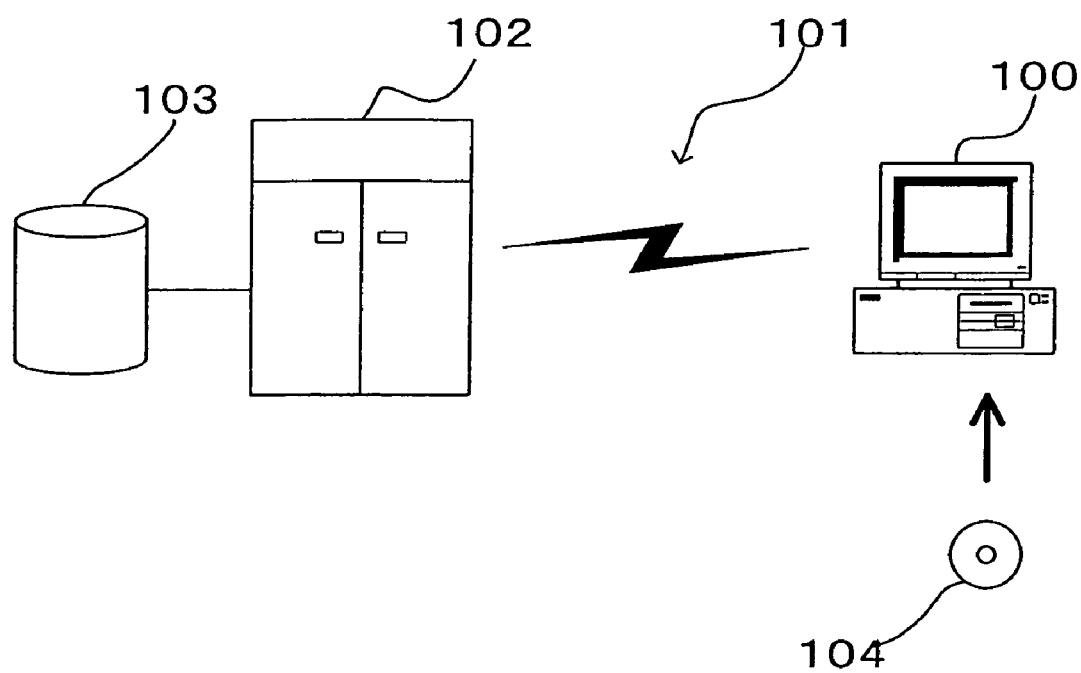
FIG. 7 illustrates how the control program may be provided.

When the present invention is adopted in a personal computer or the like, the control program may be provided in a recording medium such as a CD-ROM or a DVD-ROM or as a data signal on the Internet or the like. FIG. 7 shows how this may be achieved. A personal computer 100 receives the program via a CD-ROM 104. In addition, the personal computer 100 has a function that allows it to be connected with a communication line 101. A computer 102 is a server computer that provides the program stored in a recording medium such as a hard disk 103. The communication line 101 may be a communication line for Internet communication, personal computer communication or the like, or it may be a dedicated communication line. The computer 102 reads out the program from the hard disk 103 and transmits the program to the personal computer 100 via the communication line 101. Namely, the program is embodied as a data signal on a carrier wave and is transmitted via the communication line 101. In other words, the program can be distributed as a computer-readable computer program product adopting any of various modes such as a recording medium and a carrier wave.

They above described embodiment is an example, and various modifications can be made without departing from the spirit and scope of invention.

What is claimed is:

1. An update system for updating search data used in a navigation apparatus, comprising:
   a navigation apparatus; and
   an update data provider apparatus, wherein:
   the navigation apparatus comprises a search data acquisition unit that obtains search data containing first search tree data and a first entity data group constituted with a plurality of sets of entity data that can be specified by using the first search tree data, and a control unit that executes navigation-related processing by using the search data;
   the update data provider apparatus comprises an update data generation unit that generates at least one set of update entity data and second search tree data assuming a structure that enables specification of the update entity data and enables specification of entity data in the first entity data group other than entity data corresponding to the update entity data, to be used to update the search data, and a provider unit that provides the second search tree data and the update entity data having been generated to the navigation apparatus;
   the navigation apparatus further comprises an update data acquisition unit that obtains the second search tree data and the update entity data provided by the provider unit of the update data provider apparatus; and the control unit in the navigation apparatus executes navigation-related processing by using the second search tree data and the update entity data obtained by the update data acquisition unit and the entity data in the first entity data group obtained by the search data acquisition unit.

2. An update system for updating search data used in a navigation apparatus according to claim 1, wherein:

the provider unit of the update data provider apparatus provides the second search tree data and the update entity data by storing the second search tree data and the update entity data in a recording medium; and the update data acquisition unit of the navigation apparatus obtains the second search tree data and the update entity data stored in the recording medium.

3. An update system for updating search data used in a navigation apparatus according to claim 1, wherein:

the provider unit of the update data provider apparatus provides the second search tree data and the update entity data via a communication medium; and the update data acquisition unit of the navigation apparatus obtains the second search tree data and the update entity data via the communication medium.

4. An update system for updating search data used in a navigation apparatus according to claim 1, wherein:

the search data are named search data, telephone number search data or mailing address search data.

5. An update system for updating search data used in a navigation apparatus according to claim 1, wherein:

the search data are managed in units of files each corresponding to a specific unit; and the second search tree data and the update entity data used to update search data in each file are provided in a single file.

6. A navigation apparatus that constitutes an update system for updating search data used in a navigation apparatus according to claim 1.

7. An update data provider apparatus that constitutes an update system for updating search data used in a navigation apparatus according to claim 1.

* * * * *